United States Patent
McCann

(10) Patent No.: US 10,247,345 B2
(45) Date of Patent: Apr. 2, 2019

(54) APPARATUS AND METHOD FOR HEATING SUBSEA PIPELINE

(71) Applicant: ICPTECH PTY LTD, East Perth (AU)

(72) Inventor: Gareth Macgregor McCann, East Perth (AU)

(73) Assignee: ICPTECH PTY LTD (AU)

( * ) Notice: Subject to any disclaimer, the term of this patent is extended or adjusted under 35 U.S.C. 154(b) by 0 days.

(21) Appl. No.: 15/748,385

(22) PCT Filed: Feb. 2, 2017

(86) PCT No.: PCT/AU2017/050084
§ 371 (c)(1),
(2) Date: Jan. 29, 2018

(87) PCT Pub. No.: WO2017/143389
PCT Pub. Date: Aug. 31, 2017

(65) Prior Publication Data
US 2019/0003629 A1    Jan. 3, 2019

(30) Foreign Application Priority Data

Feb. 24, 2016 (AU) ................................ 2016900670

(51) Int. Cl.
| | |
|---|---|
| *H05B 6/10* | (2006.01) |
| *F16L 53/34* | (2018.01) |
| *H02G 1/10* | (2006.01) |
| *H02G 9/02* | (2006.01) |
| *H05B 6/36* | (2006.01) |

(52) U.S. Cl.
CPC ................ *F16L 53/34* (2018.01); *H02G 1/10* (2013.01); *H02G 9/02* (2013.01); *H05B 6/101* (2013.01); *H05B 6/36* (2013.01); *H05B 6/365* (2013.01)

(58) Field of Classification Search
CPC ... H05B 6/02; H05B 6/04; H05B 6/06; H05B 6/101; H05B 6/108; H05B 6/365; H05B 6/36; F16L 53/004; F16L 53/007; F16L 53/34; F16L 53/37; F16L 53/38; H02G 1/10; H02G 9/02
USPC ....... 219/600, 634, 635, 637, 642, 643, 644, 219/660, 661, 672, 675, 676
See application file for complete search history.

(56) References Cited

U.S. PATENT DOCUMENTS 4,388,510 A * 6/1983 Hughes ................... H05B 6/44
                                                            219/643
5,186,755 A * 2/1993 Carlson, Jr. ......... B05B 13/0436
                                                            219/676

(Continued)

*Primary Examiner* — Hung D Nguyen
(74) *Attorney, Agent, or Firm* — Galbreath Law Offices, P.C.; John A. Galbreath

(57) ABSTRACT

Provided is apparatus (20) for heating a portion of subsea pipeline (10). The apparatus (20) generally comprises at least one electrical conductor (22), and a deployment mechanism (24) which is configured to operatively support a length of said electrical conductor (22) in a looped manner. In addition, the deployment mechanism (24) is further configured to deploy the looped conductor (26) circumferentially about at least a portion of the pipeline (10). When the conductor (22) is connected to a suitable power supply, the looped conductor (26) is configured to operatively induce an alternating magnetic field within the portion of the pipeline (10) in order to generate heat therein through induction heating.

19 Claims, 8 Drawing Sheets

(56) References Cited

U.S. PATENT DOCUMENTS

| | | | |
|---|---|---|---|
| 6,278,095 B1 | 8/2001 | Bass | |
| 2006/0289493 A1 | 12/2006 | Thomas | |
| 2008/0105671 A1* | 5/2008 | Regan | B23K 9/235 |
| | | | 219/643 |
| 2008/0149343 A1 | 6/2008 | Chitwood | |
| 2013/0098625 A1 | 4/2013 | Hickman | |
| 2013/0220996 A1 | 8/2013 | Liney | |
| 2013/0341320 A1* | 12/2013 | Tailor | F16L 13/0272 |
| | | | 219/643 |
| 2014/0295100 A1* | 10/2014 | Baskerville | H05B 6/36 |
| | | | 219/672 |
| 2015/0048079 A1 | 2/2015 | Heggdal et al. | |

* cited by examiner and cools as it flows down a subsea pipeline. As the layer of paraffin builds up on the subsea pipeline inner diameter, the inner diameter of the paraffin becomes smaller and smaller. Ultimately a pigging device intended to clean the paraffin will cause the paraffin to separate from the inner wall of the pipeline and become a plug. In some cases the paraffin will release from the subsea pipeline inner diameter without a pig and cause a blockage. In either case, if the pressure in the pipeline is enough to move the plug along the pipeline, it will continue to collect additional paraffin as it moves until the length of the blockage cannot be moved by the available pressure.

APPARATUS AND METHOD FOR HEATING SUBSEA PIPELINE

TECHNICAL FIELD

This invention relates to apparatus for heating a portion of a subsea pipeline, a method of heating a portion of a subsea pipeline, and an associated system for heating a portion of a subsea pipeline.

BACKGROUND ART

The following discussion of the background art is intended to facilitate an understanding of the present invention only. The discussion is not an acknowledgement or admission that any of the material referred to is or was part of the common general knowledge as at the priority date of the application.

The field of this invention is that of prevention and/or removal of blockages in pipelines, such as remote subsea pipelines. Offshore hydrocarbon recovery operations are increasingly moving into deeper water and more remote locations. Often satellite wells are completed at the sea floor and are tied to remote platforms or other facilities through extended subsea pipelines. Some of these pipelines extend through water that is thousands of feet deep and where temperatures of the water near the sea floor are in the range of 40° F. or less.

The hydrocarbon fluids thus recovered, usually produced along with some water, reach the sea floor at much higher temperatures, characteristic of depths thousands of feet below the sea floor. When the hydrocarbon fluids and any water present begin to cool, phenomena occur that may significantly affect flow of the fluids through the pipelines. Some crude oils become very viscous or deposit paraffin when the temperature of the oil drops, making the oil practically not flowable.

Similarly, hydrocarbon gas under pressure combine with water at reduced temperatures to form a solid material, called a 'hydrate'. Hydrates are generally a porous solid which is formed primarily of water with a mixture of gases. It is effectively similar to ice. There is a tendency for hydrates to form in the pipelines departing from a subsea gas well, especially on well start-up. The temperature of seawater at depths will often approach 32° F., with the temperature in non-flowing pipelines being the same. When a subsea pipeline valve is opened, the gas expansion can cause substantial additional cooling. In these cold and high pressure conditions, hydrates of the gas and water can quickly form.

Hydrates can plug pipelines and the plugs are very difficult to remove. In deep water, conventional methods of depressurizing the flow line to remove a hydrate plug may not be effective. Higher pressures in the line and uneven sea floor topography require excessive time and may create more operational problems and be costly in terms of lost production. For example, frequently when hydrates form, it forms a blockage that will be somewhat porous. At that time, a high pressure will exist on the upstream side and a lower pressure will exist on the downstream side of the blockage. This means that additional gas will move thru the hydrate plug and expand and therefore cool as it does. This means that not only can the expansion of this gas keep the formed hydrates cool, but can literally continue to grow additional hydrate blockage.

Similarly, paraffins can form blockages in pipelines by building up on the inner diameter of the cold pipelines as relatively warm hydrocarbon fluid circulates out of a well The problem of lower temperatures in subsea pipelines has been addressed by placing thermal insulation on the lines, but the length of some pipelines makes thermal insulation alone ineffective. Increased flow rate through the lines also helps to minimize temperature loss of the fluids, but flow rate varies and is determined by other factors. Problems of heat loss from a pipeline increase late in the life of a hydrocarbon reservoir because production rates often decline at that time. Problems become particularly acute when a pipeline must be shut-in for an extended period of time. This may occur, for example, because of work on the wells or on facilities receiving fluids from the pipeline or hurricane shutdown. The cost of thermal insulation alone to prevent excessive cooling of the lines becomes prohibitive under these conditions.

Conventional solutions include heating of pipelines by bundling the lines with a separate pipeline that can be heated by circulation of hot fluids. Other prior art include devices as found in U.S. Pat. No. 6,939,082 describing a method of taking a remotely operated vehicle (ROV) to the ocean floor to land on and move along a subsea pipeline above or below the seafloor and repeatedly circulate seawater which has been heated electrically, mechanically, or chemically across the outer surface of the pipeline to melt hydrates or paraffins which have formed on the inside of the pipeline.

Yet other attempts have been made to enter the end of the pipeline with a somewhat flexible string of coiled tubing to get to the blockage and wash it out. This is an expensive operation, and in some cases the blockage can be 10 to 20 miles away. Removal by use of coiled tubing can be further complicated if the pipeline has bends in it, making passage of the coiled tubing difficult if not impossible.

Still other proposed solutions involve human divers servicing subsea pipelines, or via a technique called 'hot tapping', which involves connecting to an existing pipeline without interrupting pipeline flow.

All the conventional methods are generally costly, dangerous and with unpredictable results, even in situations where such methods are practical. The present invention seeks to propose possible solutions, at least in part, in amelioration of the shortcomings in the art.

SUMMARY OF THE INVENTION

According to a first aspect of the invention there is provided apparatus for heating a portion of a subsea pipeline, said apparatus comprising:
  at least one electrical conductor; and
  a deployment mechanism configured to operatively support a length of said electrical conductor in a looped manner, the mechanism configured to deploy the looped conductor circumferentially about at least a portion of the pipeline, wherein when connected to a suitable power supply said conductor is configured to operatively induce an alternating magnetic field within the portion of the pipeline to generate heat therein through induction heating.

It is to be appreciated that induction heating is the process of heating an electrically conducting object, such as the portion of the pipeline, via electromagnetic induction which generates heat in the object through resistance to induced eddy currents.

It is further to be appreciated that 'in a looped manner' may refer to any arrangement where the conductor is folded onto and/or over itself, e.g. where portions of the conductor are snaked against other portions, some portion looped over other portions, and/or the like. Typically, 'in a looped manner' is to be understood as any conductor configuration which is able to facilitate induction of the magnetic field.

In one example, the electrical conductor may comprise a variable frequency induction lead.

Typically, the induction lead may be fluid cooled.

In one example, the apparatus may include an electrical power source.

Typically, the electrical power source may comprise a variable frequency, variable current and/or variable voltage power source.

Typically, the electrical power source includes a controller to monitor and automatically control a temperature induced within the portion of pipeline.

Preferably, the electrical conductor has sufficient length so that the electrical power source may be located remotely from the deployment mechanism in order to facilitate subsea deployment thereof.

In one example, the deployment mechanism may comprise a planar surface member on which the conductor is looped, said surface member configured to be flexible along a single axis.

In one example, the planar surface member may comprise a slatted framework comprised of a plurality of slats arranged in parallel to be flexible along an axis substantially transverse to a length of such slats.

Typically, the plurality of slats of the slatted framework includes a plurality of interconnecting biasing members for operatively tensioning the slats about the portion of pipeline. The biasing members may include spring members, or the like.

Typically, the slatted framework may be under tension from the biasing members with deployment wires for releasing the tension in order to deploy the slats about the portion of pipeline.

Typically, the deployment mechanism may include spacers arranged to operatively abut against the pipeline to maintain the conductor at a desired position relative to said pipeline.

In one example, the deployment mechanism may be configured to remotely deploy the looped conductor about the portion of the pipeline.

Typically, the deployment mechanism may comprise an actuation assembly configured to operatively urge the planar surface member about the portion of the pipeline when actuated.

In one example, the actuation assembly may be remotely actuatable.

Alternatively, the actuation assembly may be locally actuatable.

In one example, the actuation assembly may comprise at least two arms hinged together in a tongs-like arrangement supporting said deployment mechanism therebetween and actuatable between an open position (in which the deployment mechanism is suspended between the arms) and a closed position (in which the deployment mechanism urges the planar surface about the portion of the pipeline).

Typically, the actuation assembly may comprise four arms hinged together in a tongs-like framework arrangement for supporting the planar surface member.

According to a second aspect of the invention there is provided a method of heating a portion of a subsea pipeline, said method comprising the steps of:

providing an apparatus for heating a portion of a subsea pipeline, said apparatus having at least one electrical conductor and a deployment mechanism configured to operatively support a length of said electrical conductor in a looped manner, the mechanism configured to deploy the looped conductor circumferentially about at least a portion of the pipeline, wherein when connected to a suitable power supply, said conductor is configured to operatively induce an alternating magnetic field within the portion of the pipeline to generate heat therein through induction heating;

deploying said conductor onto the portion of pipeline via the deployment mechanism; and energising said conductor from a surface vessel.

Typically, the step of energising the conductor may comprise connecting a variable frequency, variable current and/or variable voltage electrical power source to the conductor.

In one example, the step of energising the conductor may comprise controlling the power source in order to induce a particular alternating magnetic field within the portion of the pipeline.

In one example, the step of deploying the conductor may be performed by means of a deployment mechanism configured to remotely deploy the looped conductor about the portion of the pipeline.

Typically, the step of deploying the conductor may be performed remotely.

Alternatively, the step of deploying the conductor may be performed locally.

In one example, the step of deploying the conductor may comprise actuating at least two arms hinged together in a tongs-like arrangement and supporting said deployment mechanism therebetween from an open position (in which the deployment mechanism is suspended between the arms) to a closed position (in which the deployment mechanism urges the conductor about the portion of pipeline).

According to a third aspect of the invention there is provided a system for heating a portion of a subsea pipeline, said system comprising:

apparatus for heating a portion of a subsea pipeline, said apparatus comprising at least one electrical conductor and a deployment mechanism configured to operatively support a length of said electrical conductor in a looped manner, the mechanism configured to deploy the looped conductor circumferentially about at least a portion of the pipeline, wherein when connected to a suitable power supply said conductor is configured to operatively induce an alternating magnetic field within the portion of the pipeline to generate heat therein through induction heating; and a variable frequency, variable current and/or variable voltage electrical power source for operatively energising said conductor.

In one example, the system may comprise a surface vessel housing the electrical power supply.

Typically, the surface vessel may comprise a spool for spooling a length of the conductor.

Typically, the surface vessel may comprise a winch for operatively winching a cable via which the apparatus is lowered onto, or raised from, the pipeline.

According to a fourth aspect of the invention there is provided apparatus for heating a portion of a subsea pipeline, said apparatus comprising:

at least one electrical conductor;

a deployment mechanism configured to operatively support a length of said electrical conductor in a looped manner, the mechanism configured to deploy the looped conductor circumferentially about at least a portion of the pipeline thereby forming a circuit;

an electrical power supply operatively connected to the conductor, said supply configured to operatively induce an alternating magnetic field within the circuit to generate heat in the portion of the pipeline through induction heating; and a controller for controlling said power supply and configured to automatically determine and maintain a resonant frequency in the circuit by dynamically adjusting a capacitive reactance to match an inductive reactance of the circuit during heating of the pipeline.

It is to be appreciated that induction heating is the process of heating an electrically conducting object, such as the portion of the pipeline, via electromagnetic induction which generates heat in the object through resistance to induced eddy currents.

It is further to be appreciated that the inductive reactance of the circuit is typically determined by a circumference of the looped conductor about the pipeline, as well as aspects such as the heating requirements, a wall thickness of the pipeline, induction field depth penetration into such pipeline wall, skin effect, a target temperature, etc. Accordingly, these aspects can vary between pipelines and/or portions of pipelines, as well as during heating of the portion of pipeline.

In one example, the electrical conductor may comprise a variable frequency fluid-cooled induction lead.

Typically, the electrical power supply may comprise a variable frequency, variable current and/or variable voltage power source.

Typically, the controller may be configured to automatically determine and maintain the resonant frequency of the circuit by periodically applying a voltage to observe a frequency response to determine resonance and adjusting the capacitive reactance, if required, to match the inductive reactance.

Preferably, the electrical conductor has sufficient length so that the electrical power source may be located remotely from the deployment mechanism in order to facilitate subsea deployment thereof.

In one example, the deployment mechanism may comprise a planar surface member on which the conductor is looped, said surface member configured to be flexible along a single axis.

In one example, the planar surface member may comprise a slatted framework comprised of a plurality of slats arranged in parallel to be flexible along an axis substantially transverse to a length of such slats.

Typically, the deployment mechanism may include spacers arranged to operatively abut against the pipeline to maintain the conductor at a desired position relative to said pipeline.

In one example, the deployment mechanism may be configured to remotely deploy the looped conductor about the portion of the pipeline.

Typically, the deployment mechanism may comprise an actuation assembly configured to operatively urge the planar surface member about the portion of the pipeline when actuated.

In one example, the actuation assembly may be remotely actuatable.

Alternatively, the actuation assembly may be locally actuatable.

In one example, the actuation assembly may comprise at least two arms hinged together in a tongs-like arrangement supporting said deployment mechanism therebetween and actuatable between an open position (in which the deployment mechanism is suspended between the arms) and a closed position (in which the deployment mechanism urges the planar surface about the portion of the pipeline).

Typically, the actuation assembly may comprise four arms hinged together in a tongs-like framework arrangement for supporting the planar surface member.

According to a fifth aspect of the invention there is provided apparatus for heating a portion of a subsea pipeline, said apparatus comprising:

at least one electrical conductor;

a deployment mechanism configured to operatively support a length of said electrical conductor in a looped manner, the mechanism configured to deploy the looped conductor circumferentially about at least a portion of the pipeline; and an actuation assembly configured to operatively position the deployment mechanism relative to the pipeline and to actuate the deployment mechanism for subsequent deployment, the actuation assembly configured to displace said deployment mechanism in at least two planes in Euclidean space to allow desired positioning of the deployment mechanism relative to the pipeline, wherein an alternating magnetic field is inducible within the portion of pipeline via the conductor, once deployed, to generate heat through induction heating.

In one example, the deployment mechanism may comprise a planar surface member on which the conductor is looped, said surface member configured to be flexible along a single axis.

In one example, the planar surface member may comprise a slatted framework comprised of a plurality of slats arranged in parallel to be flexible along an axis substantially transverse to a length of such slats.

Typically, the deployment mechanism may include spacers arranged to operatively abut against the pipeline to maintain the conductor at a desired position relative to said pipeline.

In one example, the actuation assembly may comprise at least two arms hinged together in a tongs-like arrangement supporting said deployment mechanism therebetween and actuatable between an open position (in which the deployment mechanism is suspended between the arms) and a closed position (in which the deployment mechanism urges the planar surface about the portion of the pipeline).

Typically, the actuation assembly may comprise four arms hinged together in a tongs-like framework arrangement for supporting the planar surface member.

Typically, the actuation assembly comprises a primary framework supporting a nested secondary framework therein, said secondary framework supporting the deployment mechanism and arranged displaceable relative to the primary framework.

Typically, the actuation assembly comprises at least two actuators configured to displace the secondary framework relative to the primary framework.

Typically, the primary framework comprises a displacement mechanism configured to displace the primary framework along a length of the pipeline.

Typically, the primary framework straddles the pipeline with the displacement mechanism comprising a track arrangement on either side of the pipeline.

According to a further aspect of the invention there is provided apparatus for heating a portion of a subsea pipeline, said apparatus comprising:

at least one electrical conductor;

a deployment mechanism configured to operatively support a length of said electrical conductor in a looped manner, the mechanism configured to deploy the looped conductor circumferentially about at least a portion of the pipeline thereby forming a circuit;

an actuation assembly configured to operatively position the deployment mechanism relative to the pipeline and to actuate the deployment mechanism for subsequent deployment, the actuation assembly configured to displace said deployment mechanism in at least two planes in Euclidean space to allow desired positioning of the deployment mechanism relative to the pipeline;

an electrical power supply operatively connected to the conductor, said supply configured to operatively induce an alternating magnetic field within the circuit to generate heat in the portion of the pipeline through induction heating; and a controller for controlling said power supply and configured to automatically determine and maintain a resonant frequency in the circuit by dynamically adjusting a capacitive reactance to match an inductive reactance of the circuit during heating of the pipeline.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

In the figures, incorporated to illustrate features of an example embodiment or embodiments, like reference numerals are used to identify like parts throughout the figures.

DETAILED DESCRIPTION OF EMBODIMENTS

Figure 1:
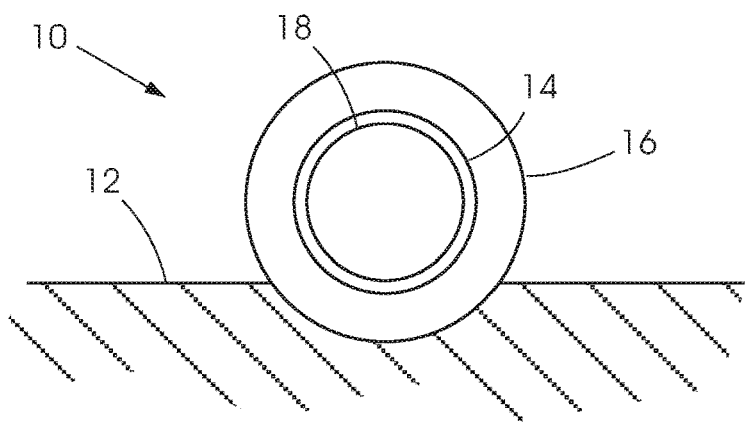
FIG. 1 is a diagrammatic cross-section representation of a subsea pipeline on a seabed.
Figure 2:
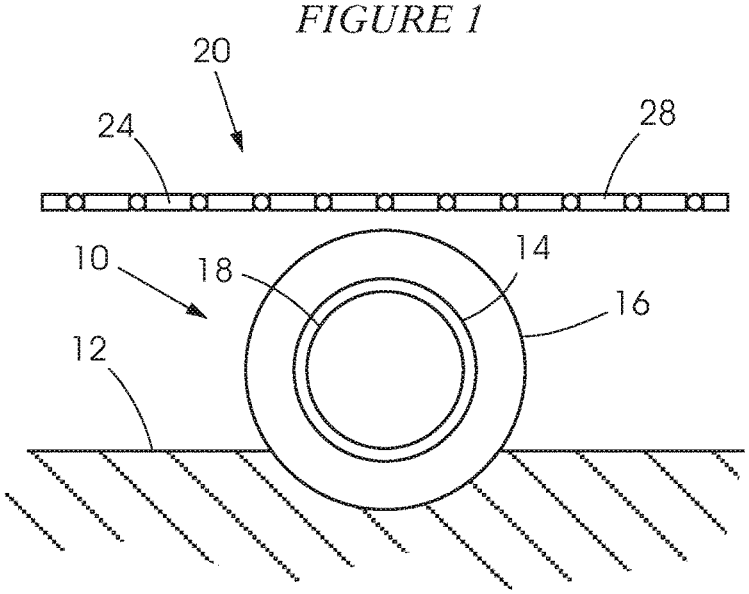
FIG. 2 is a diagrammatic cross-section representation of the subsea pipeline of FIG. 1 showing apparatus for heating a portion of a subsea pipeline, in accordance with an aspect of the invention.
Figure 3:
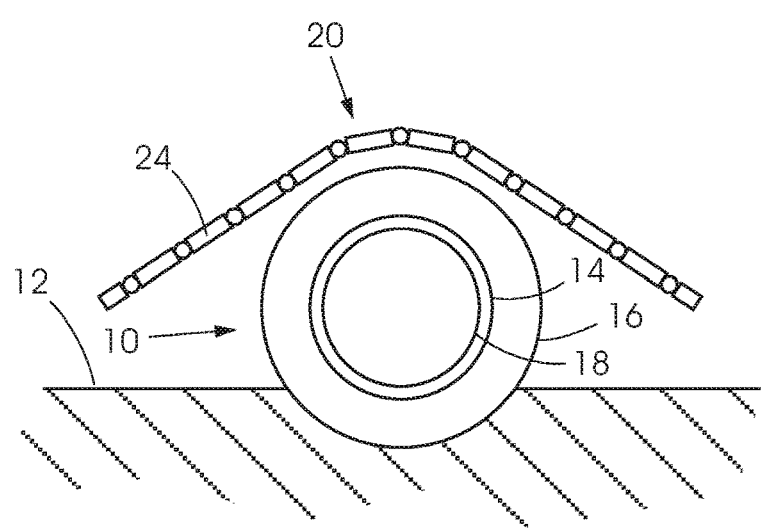
FIG. 3 is a diagrammatic cross-section representation of the subsea pipeline of FIG. 2 showing the apparatus in the process of being deployed.
Figure 4:
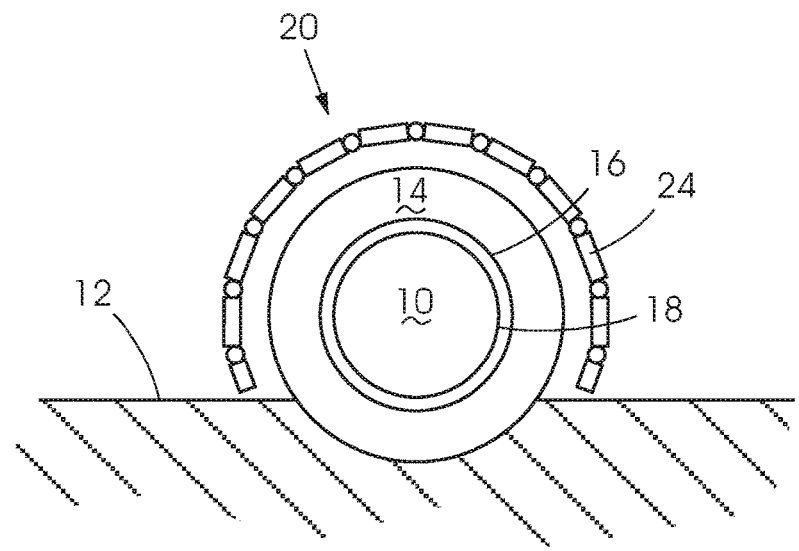
FIG. 4 is a diagrammatic cross-section representation of the subsea pipeline of FIG. 3 with the apparatus deployed onto a portion of said pipeline.

The following modes, given by way of example only, are described in order to provide a more precise understanding of the subject matter of a preferred embodiment or embodiments.

With reference now to the accompanying drawings, a typical subsea pipeline 10 is shown. The pipeline 10 generally consists of an inner wall 18 and an outer wall 14, with the entire pipeline 10 encased within thermal insulation material 16. In general, as the subsea pipeline 10 is installed on the seabed 12, it is not uncommon for such pipeline 10 to sink into the seabed 12, as shown. In effect, access to a portion of the pipeline 10 buried in the seabed is generally extremely limited.

The inner and outer walls 14 and 18 of the pipeline 10 are typically manufactured from a ferromagnetic material, such as steel. However, due to the presence of the thermal insulation material 16, the outer wall 14 of the pipeline 10 is not readily accessible, particularly when the pipeline is on the seabed 12.

The present invention provides for apparatus 20 for heating a portion of subsea pipeline. The apparatus 20 generally comprises at least one electrical conductor 22, and a deployment mechanism 24 which is configured to operatively support a length of said electrical conductor 22 in a looped manner. In addition, the deployment mechanism 24 is further configured to deploy the looped conductor 26 circumferentially about at least a portion of the pipeline 10.

When the conductor 22 is connected to a suitable power supply (described below), the looped conductor 26 is configured to operatively induce an alternating magnetic field within the portion of the pipeline 10 in order to generate heat therein through induction heating.

As mentioned above, given that the walls 14 and 18 of the pipeline 10 are typically not readily accessible due to the presence of the thermal insulation material 16, as well as possible mechanical protection material and associated shielding, it is to be appreciated that the process of heating an electrically conducting object, such as the walls 14 and 18 of the pipeline 10, via electromagnetic induction which generates heat in the walls 14 and 18 through resistance to induced eddy currents, is particularly useful.

In one example, the electrical conductor 22 typically comprises a variable frequency induction lead. Such a lead may be actively cooled by means of a fluid, such as water or oil or other suitable thermally conductive fluid. In another example, the lead may be passively cooled by means of natural convection, or the like. Preferably, the electrical conductor 22 has sufficient length so that the power supply, typically an electrical power source, can be located remotely from the deployment mechanism in order to facilitate subsea deployment thereof.

In one example, the apparatus 20 includes an electrical power source 44, such as a variable frequency, variable current and/or variable voltage power source. The electrical power source generally 44 includes a controller to monitor and automatically control a temperature induced within the portion of pipeline 10.

Figure 5:
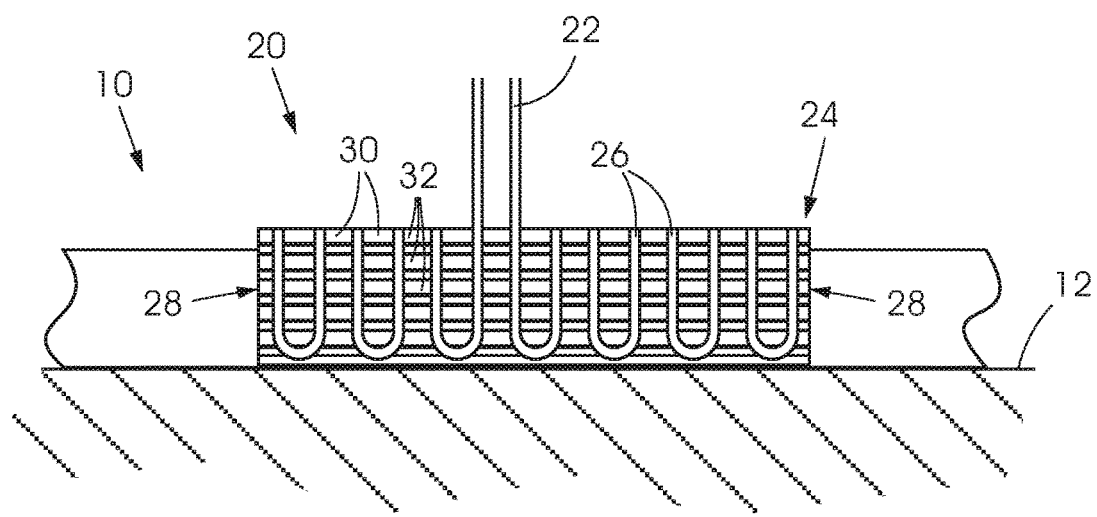
FIG. 5 is a side-view diagrammatic representation of the pipeline of FIGS. 1 to 4 showing an example of the apparatus deployed thereon.

In one example, the deployment mechanism 24 comprises a planar surface member 28 on which the conductor is looped. This planar surface member 28 is typically configured to be flexible along a single axis. For example, in the exemplified mode, the planar surface member 28 comprises a slatted framework 30 comprised of a plurality of slats 32 arranged in parallel to be flexible along an axis substantially transverse to a length of such slats 32. This arrangement is clearly shown in FIG. 5.

The deployment mechanism 24 typically further includes spacers 34, 66 that are arranged to operatively abut against the pipeline 10 in order to maintain the conductor 26 at a desired position relative to the pipeline. The spacers 34, 66 may further include proximity switches and/or sensors able to indicate when the deployment mechanism 24 is suitably deployed about the pipeline 10.

It is to be appreciated that the deployment mechanism 24 may be configured to remotely or locally deploy the looped conductor 26 about the portion of the pipeline 10. One possible mode for facilitating remote deployment of the looped conductor 26 may have the deployment mechanism 24 comprised of an actuation assembly 36 configured to operatively urge the planar surface member 28 about the portion of the pipeline 10 when actuated. Similarly, such an actuation assembly 36 may be remotely actuatable. Alternatively, the actuation assembly 36 may be locally actuatable.

Figure 6A:
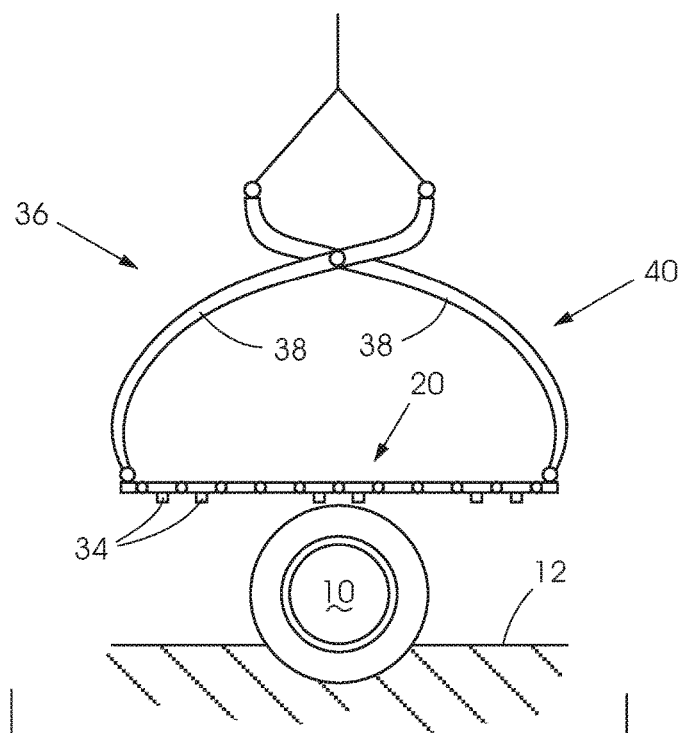
FIGS. 6(a) to 6(c) are diagrammatic cross-section representations of the subsea pipeline showing a deployment mechanism and actuation assembly of the apparatus, in use.
Figure 6B:
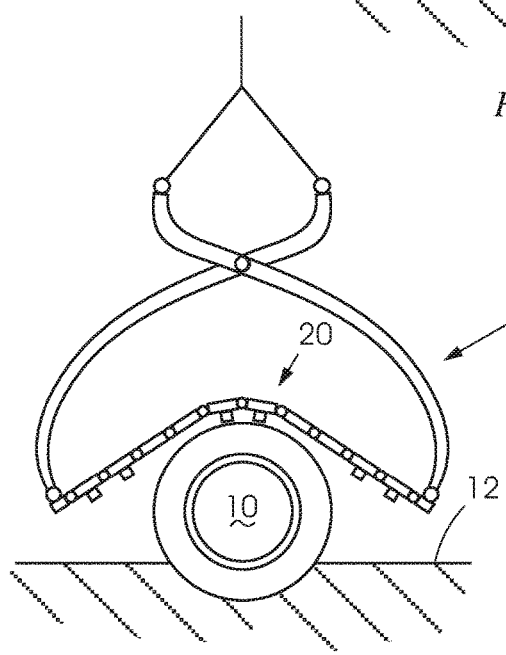
Figure 6C:
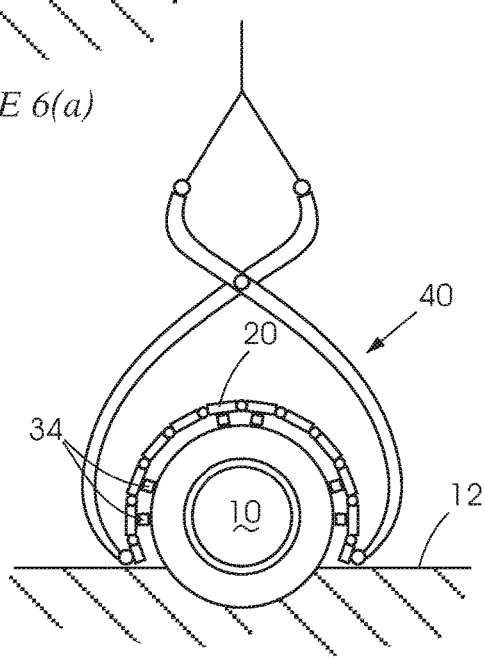

In the example of FIG. 6, the actuation assembly 36 comprises at least two arms 38 hinged together in a tongs-like arrangement 40, as shown. This arrangement 40 supports the deployment mechanism 24 therebetween and is further actuatable between an open position (in which the deployment mechanism 24 is suspended between the arms 38) and a closed position (in which the deployment mechanism 24 urges the planar surface member 28 about the portion of the pipeline 10). FIG. 6(a) shows the actuation assembly 36 in the open position, with FIG. 6(c) showing the actuation assembly 36 in the closed position.

Figure 7:
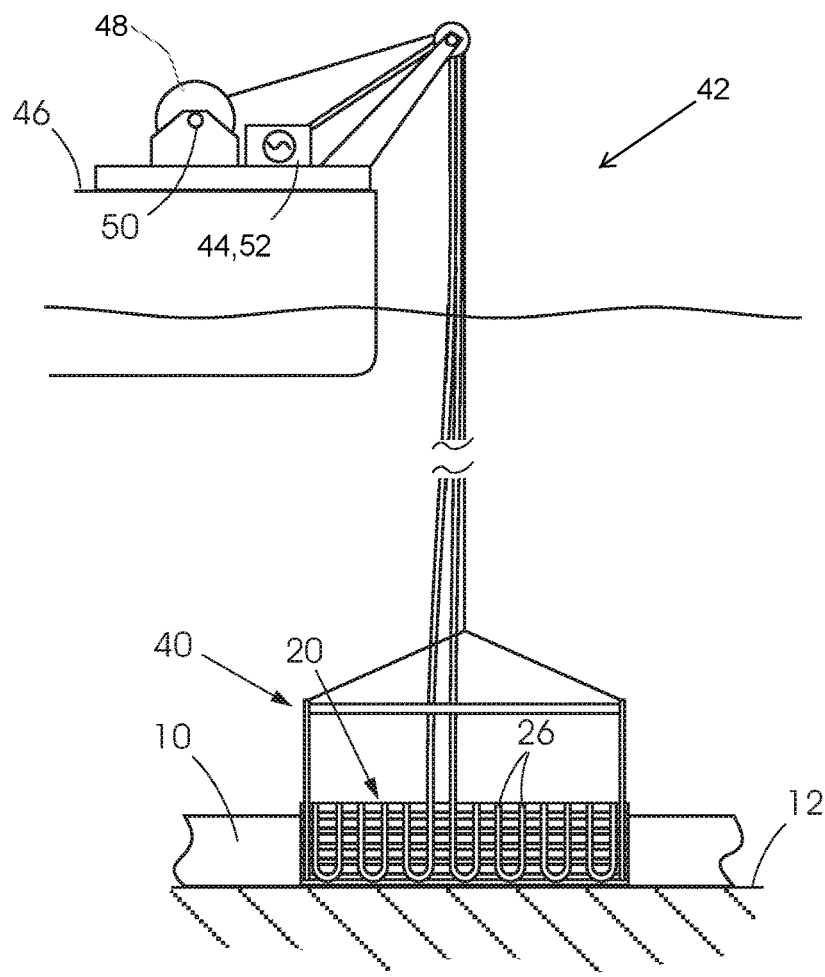
FIG. 7 is a diagrammatic side-view representation of the actuation assembly of the apparatus, in use.
Figure 8:
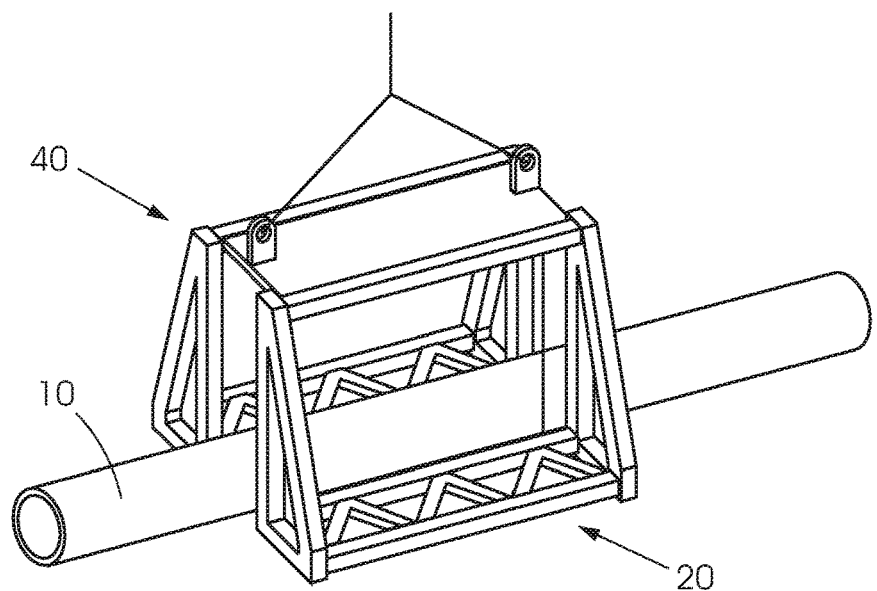
FIG. 8 is a diagrammatic perspective view representation of the actuation assembly of FIG. 7, in use.

FIGS. 7 and 8 show and example where the actuation assembly 36 comprises four arms complementarily hinged together in a tongs-like framework arrangement 40 for supporting the planar surface member 28 with looped conductor 26. However, it is to be appreciated that other arrangements are possible and within the scope of this present invention.

The present invention also provides for an associated method of heating a portion of the subsea pipeline 10. Such a method generally comprises the steps of providing the apparatus 20, deploying said looped conductor 26 onto the portion of pipeline 10 via the deployment mechanism 24, and energising the conductor 22 from a surface vessel 46.

As mentioned above, such a step of energising the conductor 22 typically comprises connecting a variable frequency, variable current and/or variable voltage electrical power source 44 to the conductor 22. Similarly, the step of energising the conductor 22 generally comprises controlling the power source 44 in order to induce a particular alternating magnetic field within the portion of the pipeline 10.

Accordingly, with particular reference to FIG. 7 of the accompanying drawings, there is shown a system 42 for heating a portion of the subsea pipeline 10. The system 42 generally comprises apparatus 20 and the variable frequency, variable current and/or variable voltage electrical power source 44 for operatively energising said conductor 22.

In a preferred example, the system 42 further comprises a surface vessel 46, such as a ship, a Floating Production, Storage and Offloading (FPSO) vessel, a topside (sea surface level or above) platform, or the like, which houses the electrical power supply 44. Typically, the surface vessel 46 comprises a spool 48 for spooling a length of the conductor 22 thereon, as well as a winch 50 for operatively winching a cable via which the apparatus 20 can be lowered onto, or raised from, the pipeline 10.

A more detailed embodiment of one aspect of the invention provides for the apparatus 20 for heating a portion of subsea pipeline 10, with the apparatus 20 comprising at the least one electrical conductor 22, a deployment mechanism 24 configured to operatively support a length of said electrical conductor in a looped manner, with the mechanism 24 configured to deploy the looped conductor 26 circumferentially about a portion of the pipeline thereby forming a circuit.

It is to be appreciated that the looped conductor 26 in combination with the portion of pipeline about which said conductor is deployed form such an electromagnetic circuit. In this circuit, electrical current passing through the conductor induces and/or interacts with magnetic fields induced in the pipeline, forming the electromagnetic circuit.

In this example, the apparatus 20 also includes an electrical power supply or source 44 which is operatively connected to the conductor. The power supply 44 is configured to operatively induce an alternating magnetic field within the circuit to generate heat in the portion of the pipeline through induction heating.

Importantly, the apparatus also includes a controller 52 for controlling the power supply 44 and which is configured to automatically determine and maintain a resonant frequency in the circuit by dynamically adjusting a capacitive reactance of the circuit to match an inductive reactance of the circuit during heating of the pipeline.

It is to be appreciated that the inductive reactance of the circuit is typically determined by a circumference of the looped conductor about the pipeline, as well as aspects such as the heating requirements, a wall thickness of the pipeline, induction field depth penetration into such pipeline wall, skin effect, a target temperature, etc. Accordingly, these aspects can vary between pipelines and/or portions of pipelines, as well as during heating of the portion of pipeline.

Accordingly, due to the fact that the exact circumference of the conductor, once wrapped around the pipe, may vary between pipelines and/or operating circumstances, the inductive reactance of the circuit is likely to vary and, as such, the circuit will generally have to be tuned to achieve resonant frequency.

Typically, the controller 52 is configured to automatically determine and maintain the resonant frequency of the circuit by periodically applying a voltage to observe a frequency response to determine resonance and adjusting the capacitive reactance, if required, to match the inductive reactance.

The resonant frequency of the circuit can generally be determined by:

$$F_R = \frac{1}{2\pi\sqrt{LC}}$$

Where $F_g$ is the frequency, L is the inductance, and C is the capacitance.

In order to achieve resonance in the circuit, the reactance X of both the capacitor and inductor that make up the circuit must be of equal reactance i.e. $X_C = X_L$. In order to achieve this, as once the conductor 26 is deployed about the outer pipe wall 16, the reactance of the inductor cannot generally be varied. As such, the controller 52 is adapted to measure the frequency of the circuit and to adjust the capacitance thereof to match the inductor's reactance. The skilled addressee will appreciate that the controller 52 may also adjust other relevant variables, where suitable.

Generally, the required resonant frequency will be determined by the heating requirements in question; wall thickness, induction field depth penetration (taking account of the skin effect), target temperature. These parameters will vary depending on the pipe in question. To determine the current frequency of the potentially un-tuned circuit, the circuit needs to be 'pinged' (i.e. apply a suitable voltage to observe frequency response and determine that this is at resonance) if resonance is not achieved the capacitance will have to be adjusted accordingly. The controller 52 provides this auto-tuning feature to determine and maintain resonant frequency in the tuned circuit prior to heating and maintain this during heating to account for unexpected disturbances to the circuit and/or its relevant variables.

Figure 14:
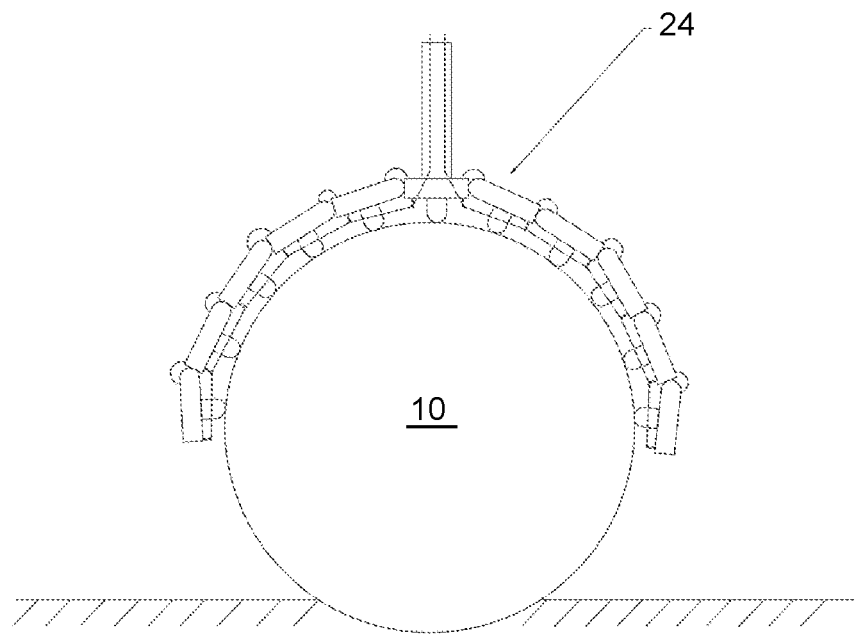
FIGS. 14 and 15 are diagrammatic cross-section representations of the subsea pipeline showing how various pipeline diameters influence an inductive reactance of the circuit established when the conductor is deployed about the pipeline.
Figure 15:
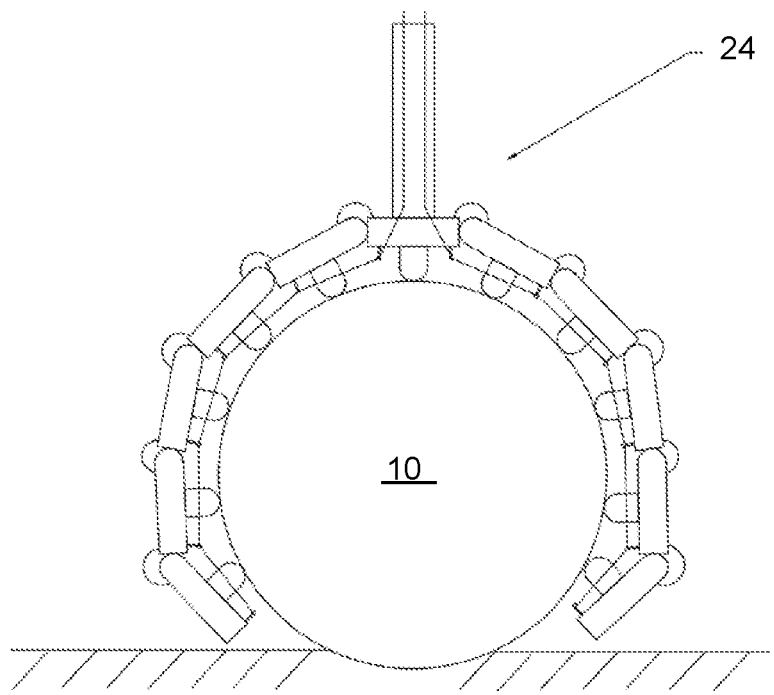

As shown in FIGS. 14 and 15, this auto-tuning capability of the controller 52 is also required to allow heating of varying pipe circumferences, which will determine the inductive reactance of the circuit so formed.

A yet further embodiment of the apparatus 20 for heating a portion of a subsea pipeline 10 is shown in FIGS. 9 to 13. In this example, the apparatus 20 comprises the electrical conductor, the deployment mechanism 24, and an actuation assembly 36.

The deployment mechanism 24 is configured to operatively support a length of the electrical conductor in a looped manner, as above, with the mechanism 24 configured to deploy the looped conductor circumferentially about at least a portion of the pipeline 10.

The actuation assembly 36 is configured to operatively position the deployment mechanism 24 relative to the pipeline 10, as well as to actuate the deployment mechanism 24 for subsequent deployment onto the pipeline 10. The actuation assembly 36 is also configured to displace said deployment mechanism 24 in at least two planes in Euclidean space to allow desired positioning of the deployment mechanism 24 relative to the pipeline 10. Once deployed in a desired position, an alternating magnetic field is inducible within the portion of pipeline via the conductor to generate heat through induction heating.

In this example, the deployment mechanism 24 generally comprises a planar surface member 28 on which the conductor 26 is looped, the surface member 28 configured to be flexible along a single axis. Typically, the planar surface member 28 comprises a slatted framework 30 comprised of a plurality of slats 32 arranged in parallel to be flexible along an axis substantially transverse to a length of such slats.

In this example, the actuation assembly 36 comprises a primary framework 54 supporting a nested secondary framework 56 therein, said secondary framework 56 supporting the deployment mechanism 24 and arranged displaceable relative to the primary framework 54. The actuation assembly 36 typically includes at least two actuators 58 configured to displace the secondary framework 56 relative to the primary framework 54.

Figure 10:
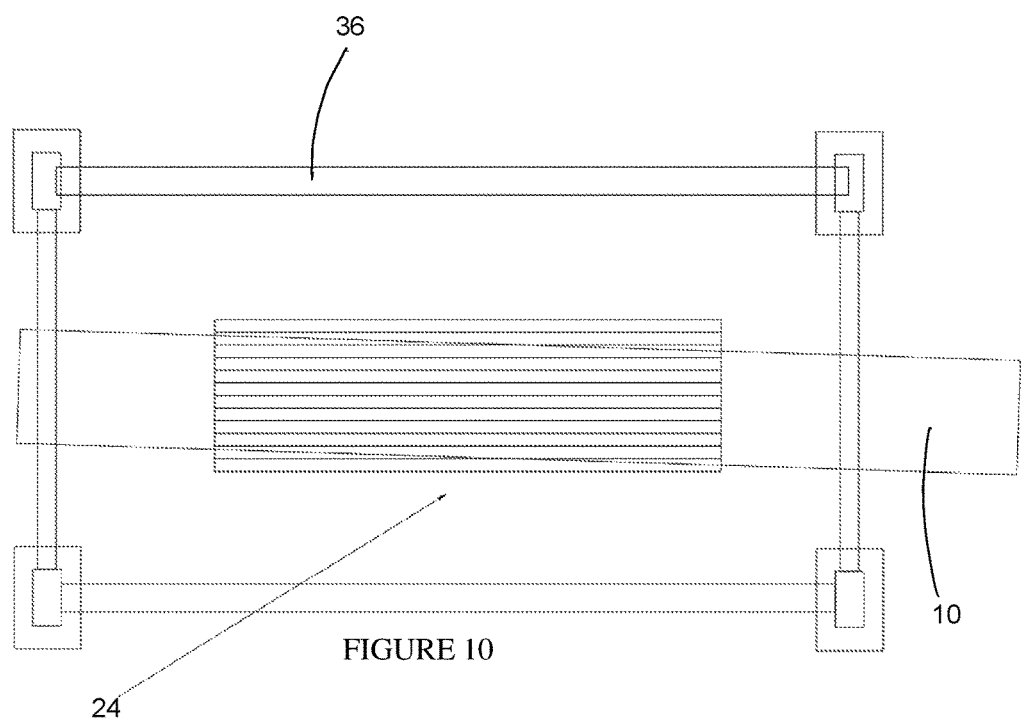
FIG. 10 is a diagrammatic top-view representation of the actuation assembly of FIG. 9, showing the deployment mechanism out of alignment with the pipeline.

For example, positioning the deployment mechanism 24 accurately on a subsea pipeline at depth can be difficult, especially when there are water currents acting on the actuation assembly 36. FIG. 10 shows the deployment mechanism 24 positioned over the pipeline 10, but the mechanism 24 is not aligned.

Figure 9:
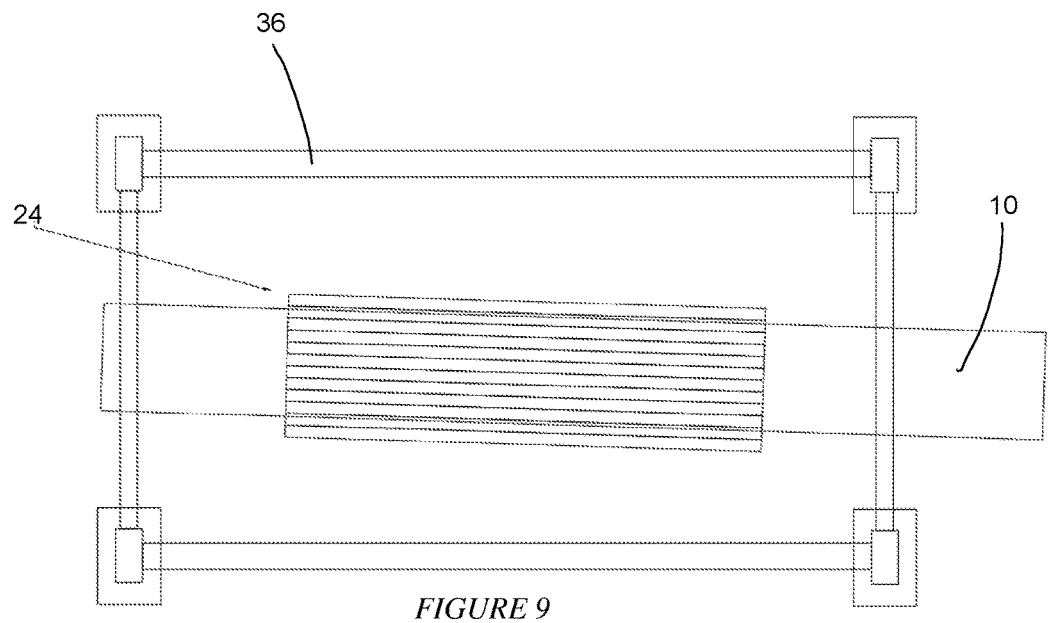
FIG. 9 is a diagrammatic top-view representation of another example of an actuation assembly for the apparatus for heating pipeline, showing the deployment mechanism aligned with the pipeline.
Figure 11:
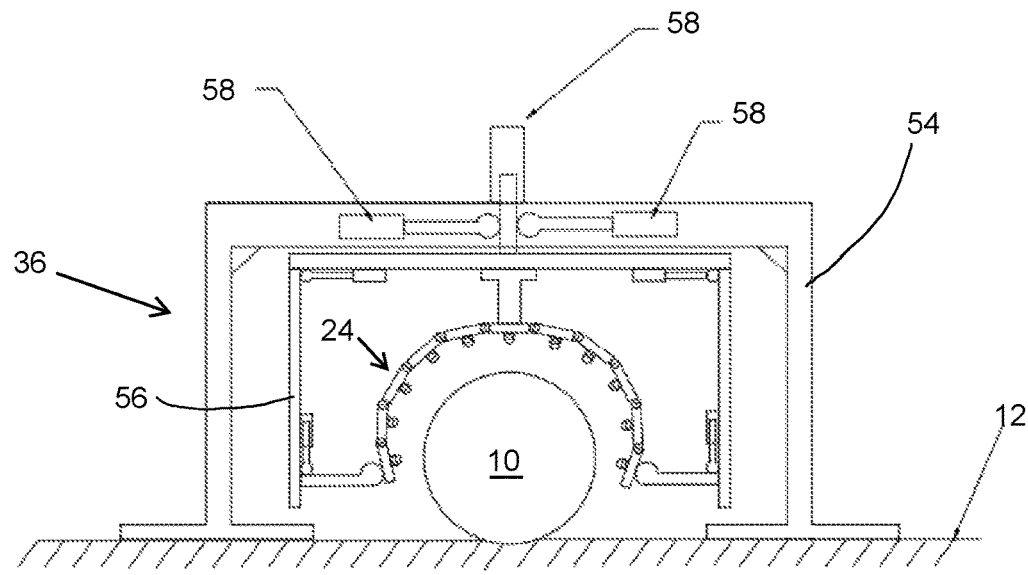
FIGS. 11 to 13 are diagrammatic front-view representations of the actuation assembly of FIG. 9 showing the conductor being deployed about a portion of the pipeline.
Figure 12:
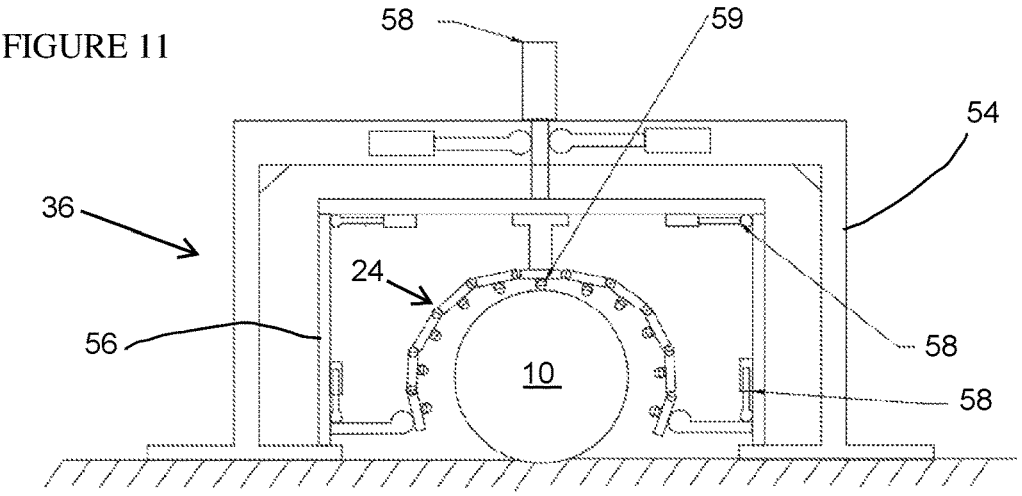
Figure 13:
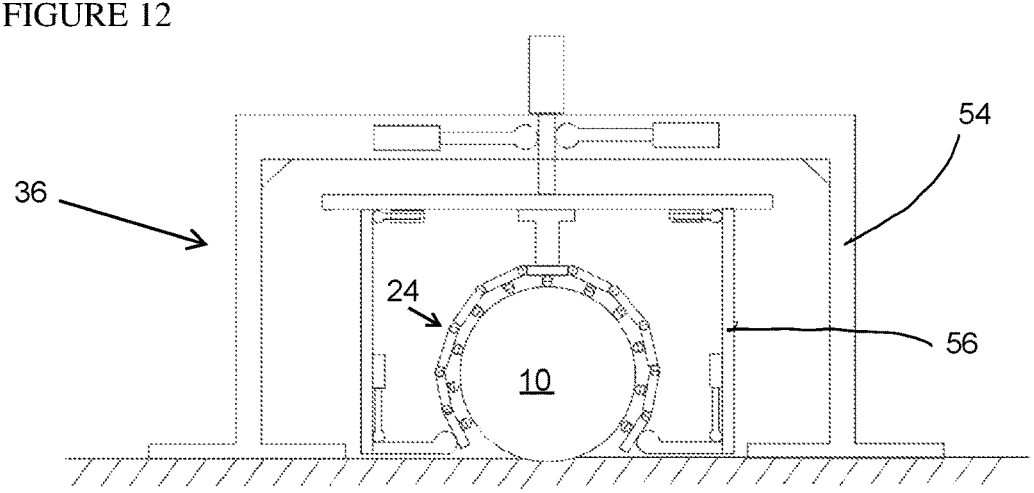

By controlling the relevant actuators 58 it is possible to rotate and align the secondary framework 56 with the pipeline 10 and relative to the primary framework 42, as shown in FIG. 9. Once so properly aligned, the relevant actuators 58 can be controlled to lower the deployment mechanism 24 onto the pipeline 10, as shown in FIGS. 11 to 13. A suitable proximity switch 59 (typically used in concert with any spacer 34, 66 proximity switches, as described above) can also be incorporated to facilitate correct deployment of the deployment mechanism 24, as will be readily understood by the skilled addressee.

Figure 16:
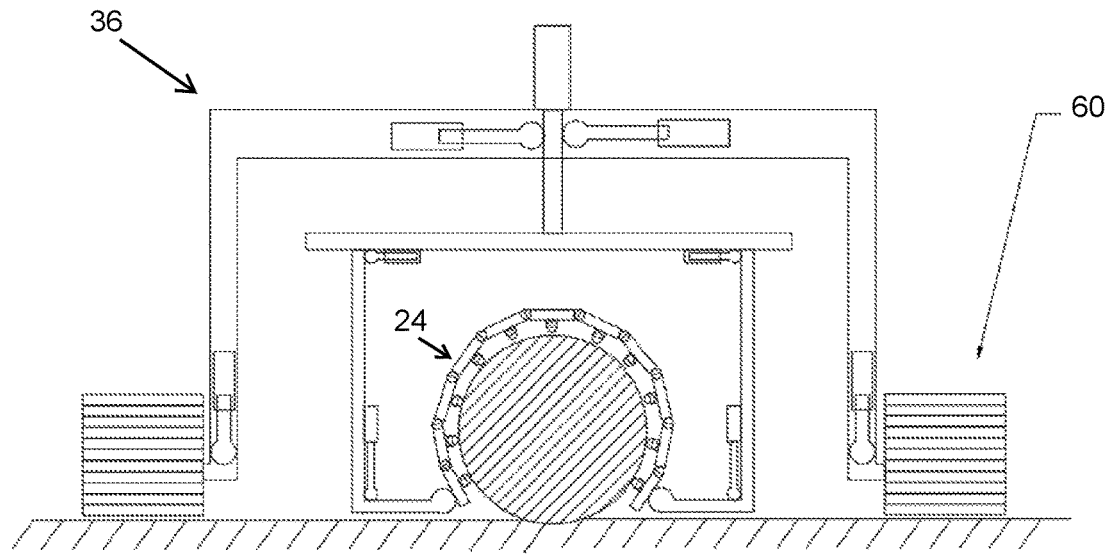
FIG. 16 is a diagrammatic front-view representation of a tracked example of the actuation assembly of FIGS. 9 to 13.

In the example shown in FIG. 16, the primary framework 54 further comprises a displacement mechanism 60 in the form of a track arrangement on either side of the pipeline configured to displace the primary framework 54 along a length of the pipeline.

Figure 17:
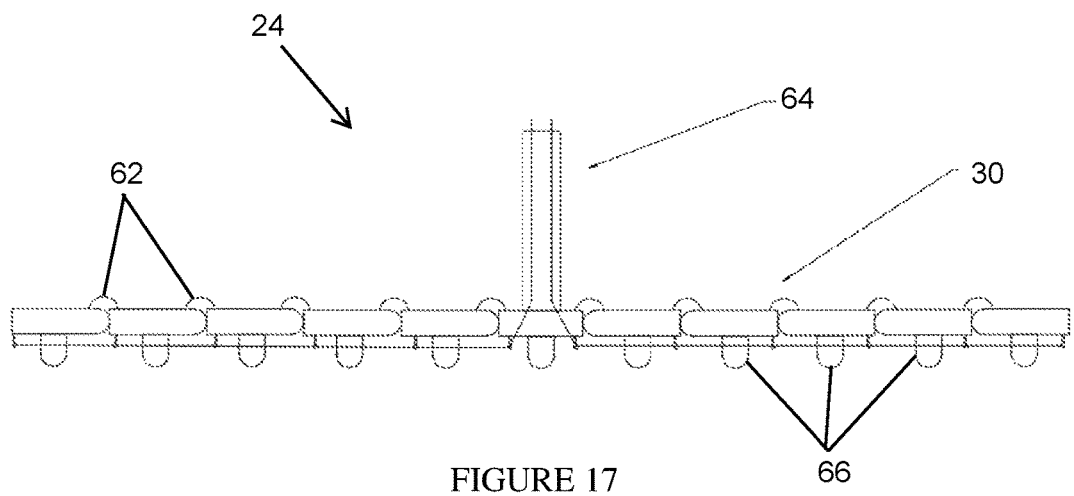
FIG. 17 is a diagrammatic front-view representation of an example of a slatted deployment mechanism having a plurality of biasing means.

FIG. 17 shows an example of the deployment mechanism 24 comprising a planar surface member 28 having a slatted framework 30 comprised of a plurality of slats 32 arranged in parallel to be flexible along an axis substantially transverse to a length of such slats 32. In this example, the plurality of slats of the slatted framework includes a plurality of interconnecting biasing members 62 for operatively tensioning the slats about the portion of pipeline. The biasing members 62 are typically spring members, or the like. The slatted framework is generally under tension from the biasing members 62 with deployment wires 64 for releasing the tension in order to deploy the slats about the portion of pipeline, as described above. The deployment mechanism 24 also typically includes spacers 66, as described above.

In a further example, the invention comprises apparatus 20 for heating a portion of subsea pipeline 10, the apparatus comprising at least one electrical conductor; the deployment mechanism configured to operatively support a length of the electrical conductor in a looped manner, the mechanism configured to deploy the looped conductor circumferentially about at least a portion of the pipeline thereby forming a circuit. The apparatus in this example also includes the actuation assembly configured to operatively position the deployment mechanism relative to the pipeline and to actuate the deployment mechanism for subsequent deployment, the actuation assembly configured to displace said deployment mechanism in at least two planes in Euclidean space to allow desired positioning of the deployment mechanism relative to the pipeline.

The apparatus 20 in this example further includes the electrical power supply operatively connected to the conductor, the supply configured to operatively induce an alternating magnetic field within the circuit to generate heat in the portion of the pipeline through induction heating; and the controller for controlling said power supply and configured to automatically determine and maintain a resonant frequency in the circuit by dynamically adjusting a capacitive reactance to match an inductive reactance of the circuit during heating of the pipeline.

Throughout this specification, reference to a 'looped' conductor is to be understood in a non-limiting manner and generally to mean a portion of the conductor which has been curved, folded and/or doubled upon itself in any manner which may facilitate induction heating in the portion of the pipeline.

Applicant believes it particularly advantageous that the invention provides for apparatus 20, an associated method, as well as system 42 whereby inaccessible subsea pipeline 10 can be heated in an attempt to prevent and/or remove hydrate and/or paraffin blockages. Of particular application is the use of induction heating which causes heating in the ferromagnetic parts of the pipeline itself, as opposed to heating through conduction, convection and/or radiation, which is inefficient and impractical for subsea pipelines.

A further advantage is the use of a variable power source able to adjust the induced alternating magnetic field within the pipeline in order to suit requirements and circumstances. In this manner, a specific portion or area of a subsea pipeline, where a hydrate or paraffin blockage has occurred, can be heated in order to soften the blockage or render the blockage to a liquid and/or gas form. As the pipeline 10 is typically installed on the seabed 12, a conventional induction coil is not a viable solution, as conventional induction coils require 360° clearances to surround the entire pipe surface. The present invention provides the planar surface member 28, such as an induction-type 'blanket' with the looped conductor 26, able to wrap around all available pipe surface to heat the pipe.

Of particular application is the use of induction heating, which is a non-contact method of electrically heating conductive materials. Utilising variable frequency, alternating currents in the looped conductor 26 creates a rapidly alternating magnetic field. This magnetic field reacts with the pipeline creating eddy current flow within the portion of the pipeline. Heat is then generated due to the resistance to eddy current flow within the material.

An important feature of the induction heating process is that heat is generated within the walls 14 and 18 of the pipeline 10 itself, instead of via an external heat source and heat conduction. This also allows for very rapid heating. In addition, there need not be any external contact, as the alternating magnetic field can be induced within the pipeline through the layer of thermal insulation material 16.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

It is to be appreciated that reference to "one example" or "an example" of the invention is not made in an exclusive sense. Accordingly, one example may exemplify certain aspects of the invention, whilst other aspects are exemplified in a different example. These examples are intended to assist the skilled person in performing the invention and are not intended to limit the overall scope of the invention in any way unless the context clearly indicates otherwise.

It is to be understood that the terminology employed above is for the purpose of description and should not be regarded as limiting. The described embodiment is intended to be illustrative of the invention, without limiting the scope thereof. The invention is capable of being practised with various modifications and additions as will readily occur to those skilled in the art. Variations (e.g. modifications and/or enhancements) of one or more embodiments described herein might become apparent to those of ordinary skill in the art upon reading this application.

The inventor expects skilled artisans to employ such variations as appropriate, and the inventor intends for the claimed subject matter to be practiced other than as specifically described herein. Accordingly, as permitted by law, the claimed subject matter includes and covers all equivalents of the claimed subject matter and all improvements to the claimed subject matter. Moreover, every combination of the above described elements, activities, and all possible variations thereof are encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language in the specification should be construed as indicating any non-claimed subject matter as essential to the practice of the claimed subject matter.

The use of words that indicate orientation or direction of travel is not to be considered limiting. Thus, words such as "front", "back", "rear", "side", "up", down", "upper", "lower", "top", "bottom", "forwards", "backwards", "towards", "distal", "proximal", "in", "out" and synonyms, antonyms and derivatives thereof have been selected for convenience only, unless the context indicates otherwise. The inventor envisages that various exemplary embodiments of the claimed subject matter can be supplied in any particular orientation and the claimed subject matter is intended to include such orientations.

The use of the terms "a", "an", "said", "the", and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Moreover, when any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein.

The invention claimed is:

1. An apparatus for heating a portion of a subsea pipeline, said apparatus comprising:
   at least one electrical conductor;
   a deployment mechanism configured to operatively support a length of said electrical conductor in a looped manner, the deployment mechanism configured to deploy the looped conductor circumferentially about at least a portion of the pipeline thereby forming a circuit;
   an actuation assembly configured to operatively position the deployment mechanism relative to the pipeline and to actuate the deployment mechanism for subsequent deployment, the actuation assembly configured to displace said deployment mechanism in at least two planes in Euclidean space to allow desired positioning of the deployment mechanism relative to the pipeline;

an electrical power supply operatively connected to the conductor, said supply configured to operatively induce an alternating magnetic field within the circuit to generate heat in the portion of the pipeline through induction heating; and a controller for controlling said power supply and configured to automatically determine and maintain a resonant frequency in the circuit by dynamically adjusting a capacitive reactance to match an inductive reactance of the circuit during heating of the pipeline.

2. The apparatus of claim 1, wherein the electrical conductor comprises a variable frequency fluid-cooled induction lead.

3. The apparatus of claim 1, wherein the electrical power supply comprises a variable frequency, variable current and/or variable voltage power source.

4. The apparatus of claim 1, wherein the controller is configured to automatically determine and maintain the resonant frequency of the circuit by periodically applying a voltage to observe a frequency response to determine resonance and adjusting the capacitive reactance, if required, to match the inductive reactance.

5. The apparatus of claim 1, wherein the electrical conductor has sufficient length so that the electrical power supply is locatable remotely from the deployment mechanism in order to facilitate subsea deployment thereof.

6. The apparatus of claim 1, wherein the deployment mechanism comprises a planar surface member on which the conductor is looped, said surface member configured to be flexible along a single axis.

7. The apparatus of claim 6, wherein the planar surface member comprises a slatted framework comprised of a plurality of slats arranged in parallel to be flexible along an axis substantially transverse to a length of such slats.

8. The apparatus of claim 1, wherein the deployment mechanism includes spacers arranged to operatively abut against the pipeline to maintain the conductor at a desired position relative to said pipeline.

9. The apparatus of claim 1, which comprises the actuation assembly configured to operatively urge the deployment mechanism about the portion of the pipeline.

10. The apparatus of claim 1, wherein the actuation assembly comprises at least two arms hinged together in a tongs-like arrangement supporting said deployment mechanism therebetween and actuatable between an open position (in which the deployment mechanism is suspended between the arms) and a closed position (in which the deployment mechanism urges the planar surface about the portion of the pipeline).

11. The apparatus of claim 1, wherein the deployment mechanism comprises a planar surface member on which the conductor is looped, said surface member configured to be flexible along a single axis.

12. The apparatus of claim 11, wherein the planar surface member comprises a slatted framework comprised of a plurality of slats arranged in parallel to be flexible along an axis substantially transverse to a length of such slats.

13. The apparatus of claim 1, wherein the deployment mechanism includes spacers arranged to operatively abut against the pipeline to maintain the conductor at a desired position relative to said pipeline.

14. The apparatus of claim 1, wherein the actuation assembly comprises at least two arms hinged together in a tongs-like arrangement supporting said deployment mechanism therebetween and actuatable between an open position (in which the deployment mechanism is suspended between the arms) and a closed position (in which the deployment mechanism urges the planar surface about the portion of the pipeline).

15. The apparatus of claim 1, wherein the actuation assembly comprises a primary framework supporting a nested secondary framework therein, said secondary framework supporting the deployment mechanism and arranged displaceable relative to the primary framework.

16. The apparatus of claim 15, wherein the actuation assembly comprises at least two actuators configured to displace the secondary framework relative to the primary framework.

17. The apparatus of claim 15, wherein the primary framework comprises a displacement mechanism configured to displace the primary framework along a length of the pipeline.

18. The apparatus of claim 15, wherein the primary framework straddles the pipeline with the displacement mechanism comprising a track arrangement on either side of the pipeline.

19. A method of heating a portion of a subsea pipeline, said method comprising the steps of:

providing apparatus for heating a portion of a subsea pipeline, said apparatus comprising at least one electrical conductor; a deployment mechanism configured to operatively support a length of said electrical conductor in a looped manner, the mechanism configured to deploy the looped conductor circumferentially about at least a portion of the pipeline; an actuation assembly configured to operatively position the deployment mechanism relative to the pipeline and to actuate the deployment mechanism for subsequent deployment to form a circuit, the actuation assembly configured to displace said deployment mechanism in at least two planes in Euclidean space to allow desired positioning of the deployment mechanism relative to the pipeline; and a controller configured to automatically determine and maintain a resonant frequency in the circuit by dynamically adjusting a capacitive reactance to match an inductive reactance of the circuit during heating of the pipeline, wherein an alternating magnetic field is inducible within the portion of pipeline via the conductor, once deployed, to generate heat through induction heating;

deploying said conductor onto the portion of pipeline via the deployment mechanism; and inducing an alternating magnetic field within the portion of pipeline via the conductor connected to a suitable power supply.

* * * * *